(12) United States Patent  
Young

(10) Patent No.: US 12,454,299 B2  
(45) Date of Patent: Oct. 28, 2025

(54) MOBILE TRANSPORTER WITH SLIDABLE STABILIZER

(71) Applicant: Nelson B. Young, Holbrook, NY (US)

(72) Inventor: Nelson B. Young, Holbrook, NY (US)

( * ) Notice: Subject to any disclaimer, the term of this patent is extended or adjusted under 35 U.S.C. 154(b) by 998 days.

(21) Appl. No.: 17/602,482

(22) PCT Filed: Apr. 30, 2019

(86) PCT No.: PCT/US2019/029881  
§ 371 (c)(1),  
(2) Date: Oct. 8, 2021

(87) PCT Pub. No.: WO2020/209876  
PCT Pub. Date: Oct. 15, 2020

(65) Prior Publication Data  
US 2022/0204065 A1 Jun. 30, 2022

Related U.S. Application Data

(60) Provisional application No. 62/833,156, filed on Apr. 12, 2019.

(51) Int. Cl.  
*B62B 3/02* (2006.01)  
*B62B 3/10* (2006.01)  
*B65D 88/12* (2006.01)  
*B65D 90/00* (2006.01)  
*B65D 90/18* (2006.01)

(52) U.S. Cl.  
CPC ............ *B62B 3/02* (2013.01); *B62B 3/10* (2013.01); *B65D 88/12* (2013.01); *B65D 90/004* (2013.01); *B65D 90/18* (2013.01); *B62B 2202/00* (2013.01)

(58) Field of Classification Search  
CPC ........... B62B 3/02; B62B 3/002; B62B 3/005; B62B 3/10; B62B 3/108  
USPC ........................................ 280/79.7  
See application file for complete search history.

(56) References Cited

U.S. PATENT DOCUMENTS 3,580,601 A * 5/1971 Miles .................... B62B 3/009  
                                                                                                     248/176.1  
3,912,086 A    10/1975   de Bruyn  
4,030,609 A    6/1977   Liebetrau et al.  
(Continued)

FOREIGN PATENT DOCUMENTS

| CN | 206630263 | 11/2017 |
|---|---|---|
| CN | 108185668 | 6/2018 |
| CN | 207969898 | 10/2018 |

OTHER PUBLICATIONS

PCT/ISA/210 International Search Report dated Jan. 10, 2020 issued in counterpart application No. PCT/US2019/029881, pp. 3.  
(Continued)

*Primary Examiner* — Jeffrey J Restifo  
(74) *Attorney, Agent, or Firm* — The Farrell Law Firm, P.C.

(57) ABSTRACT

A mobile transporter is provided. The transporter includes a lower frame structure, an upper frame structure, a plurality of posts coupled to the lower frame structure and the upper frame structure, a roller assembly provided on the lower frame structure, a panel that extends from and retracts into the transporter, and a wheel that supports the panel, when the panel is extended from the transporter between a second partially open state and a fully open state.

19 Claims, 9 Drawing Sheets

(56) References Cited

U.S. PATENT DOCUMENTS

| | | | | |
|---|---|---|---|---|
| 5,031,782 A * | 7/1991 | Minervini | ............... | B42F 15/06 |
| | | | | 211/94.01 |
| 5,037,117 A * | 8/1991 | Hershberger | ........... | B62B 3/108 |
| | | | | 280/35 |
| 5,226,656 A * | 7/1993 | Mayer | ................. | E04F 21/0023 |
| | | | | 280/47.16 |
| 5,924,577 A * | 7/1999 | Gessert | .................. | A47B 81/00 |
| | | | | 211/41.15 |
| 5,943,967 A | 8/1999 | Sherman | | |
| 6,484,893 B1 * | 11/2002 | Tkatch | .................... | A47F 3/063 |
| | | | | 211/94.01 |
| 7,770,259 B2 * | 8/2010 | Janson | ................ | E05D 15/0652 |
| | | | | 16/87 R |
| 9,340,373 B2 * | 5/2016 | McHugh | ................ | B65D 85/46 |
| 9,643,635 B2 * | 5/2017 | Allen | ...................... | B62B 3/108 |
| 9,962,020 B2 * | 5/2018 | Young | ................... | A47B 53/00 |
| 2002/0113477 A1 | 8/2002 | Uchiyama | | |
| 2009/0289017 A1 * | 11/2009 | Koeze | .................... | A47B 43/00 |
| | | | | 211/1.3 |
| 2010/0310346 A1 * | 12/2010 | Polidoros | ................ | B62B 3/108 |
| | | | | 280/79.7 |
| 2022/0204065 A1 * | 6/2022 | Young | .................... | B65D 90/18 |

OTHER PUBLICATIONS

PCT/ISA/237 Written Opinion dated Jan. 10, 2020 issued in counterpart application No. PCT/US2019/029881, pp. 7.

* cited by examiner

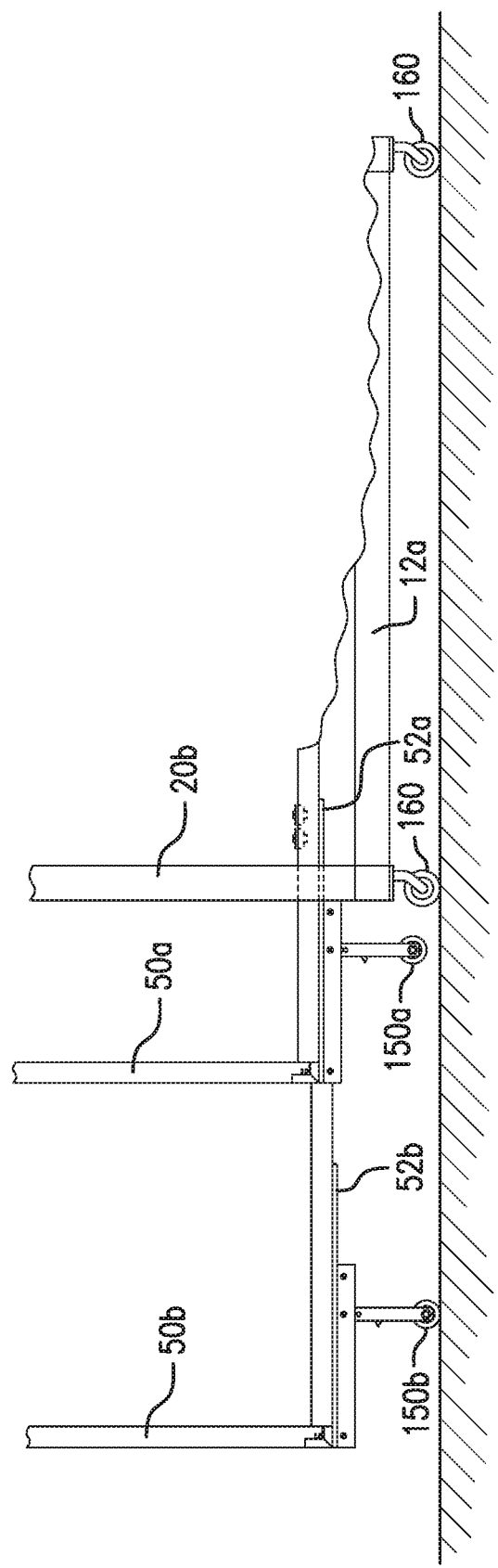

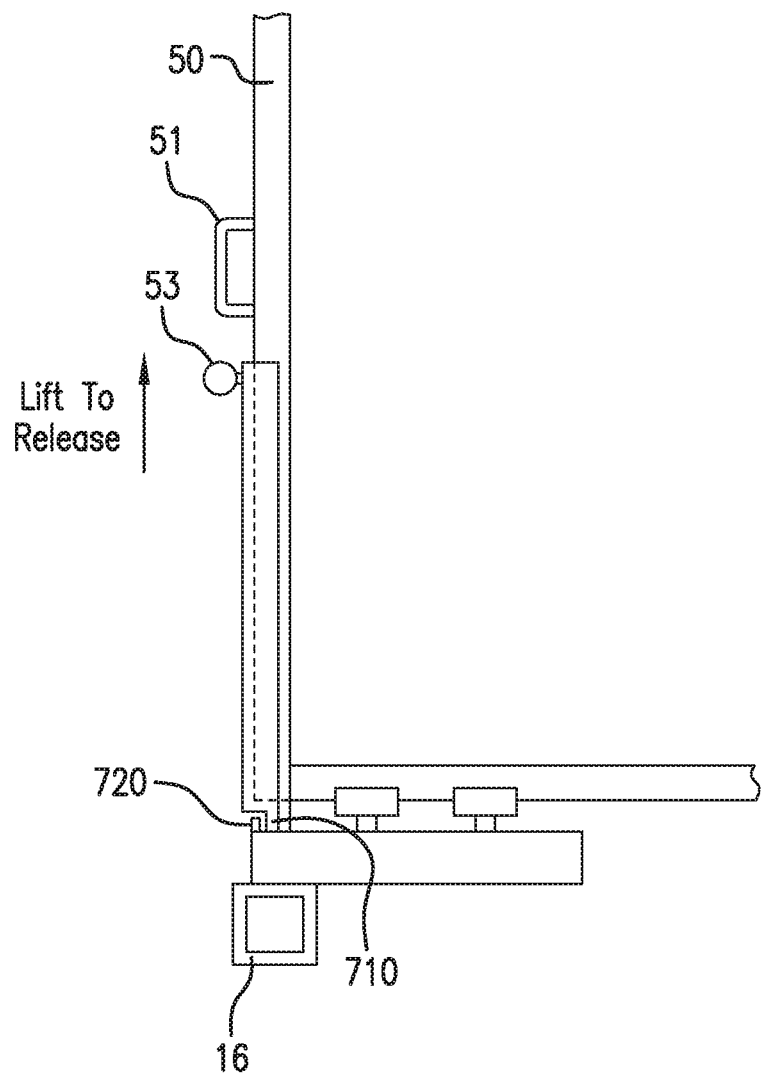

MOBILE TRANSPORTER WITH SLIDABLE STABILIZER

PRIORITY

This application claims benefit under 35 U.S.C. § 119 to a provisional patent application filed with the U.S. Patent and Trademark Office on Apr. 12, 2019, and assigned application No. 62/833,156, the contents of which are incorporated herein by reference.

BACKGROUND

1. Field of the Disclosure

The present disclosure relates generally to a hanging storage system, and more particularly, to a modular storage system for hanging items such as artwork, including pictures, paintings, etc.

2. Description of the Related Art

Museums and private art collectors frequently use hanging storage units to store artwork. These units are often quite large in size and consist of a large number of components. To ensure structural integrity, these units are generally fixed to walls and/or ceilings due to their size, thus causing potential damage to spaces where the units are in use. Conventional units generally run on a track system, thus in spaces where surfaces are uneven, use of such units may be problematic. These conventional units often require multiple skilled installers to assemble. This can be costly and intimidating. Additionally, it makes relocation and disassembly of the units a challenge for the owners.

U.S. Pat. No. 9,962,020 provides a modular hanging storage system that provides a hanging storage system that is fixed, stable, free-standing, modular and customizable in size to accommodate various spaces.

However, conventional systems fail to provide a storage system that is mobile, with slide-out storage racks having an automatically deployed stabilizer.

SUMMARY

The present disclosure has been designed to address at least the problems and disadvantages of conventional systems, and to provide at least the advantages described below.

Accordingly, an aspect of the present disclosure provides a mobile storage system which is modular and optimally utilizes space to maximize storage capabilities, and also additionally serves the purpose of easily displaying the stored items.

In accordance with an aspect of the present disclosure, a transporter is provided that includes an upper frame, a plurality of posts, a lower frame comprising a guidance rail, at least one roller assembly provided on the lower frame, a plurality of casters provided on an underside of the lower frame and configured to contact a substantially horizontal surface supporting the transporter, at least one panel that extends from and retract into a space formed by the upper frame, the plurality of posts and the lower frame, and an extendable support coupled to the at least one panel that contacts the substantially horizontal surface in response to the at least one panel being extended from the space.

In accordance with another aspect of the present disclosure, a transporter is provided that includes a frame comprising a guidance rail, at least one roller assembly provided on the frame, at least one panel configured to extend from and retract into a space above the frame, and an extendable support coupled to the at least one panel, with the extendable support contacting a substantially horizontal surface supporting the transporter in response to the at least one panel being extended from the space to a second partially open state from a first extended state.

In accordance with a further aspect of the present disclosure, a transporter is provided that includes a frame comprising a guidance rail, at least one roller assembly provided on the frame, a plurality of casters provided on an underside of the frame and configured to contact a substantially horizontal surface, at least one panel configured to extend from and retract into a space formed by the frame, and an extendable support coupled to the at least one panel, with the extendable support contacting the substantially horizontal surface in response to the at least one panel being extended from the space.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B is profile view of the transporter of FIG. 5A;

FIG. 8 is a profile view of the locking mechanism of FIG. 7.

DETAILED DESCRIPTION OF THE PRESENT DISCLOSURE

Figure 1:
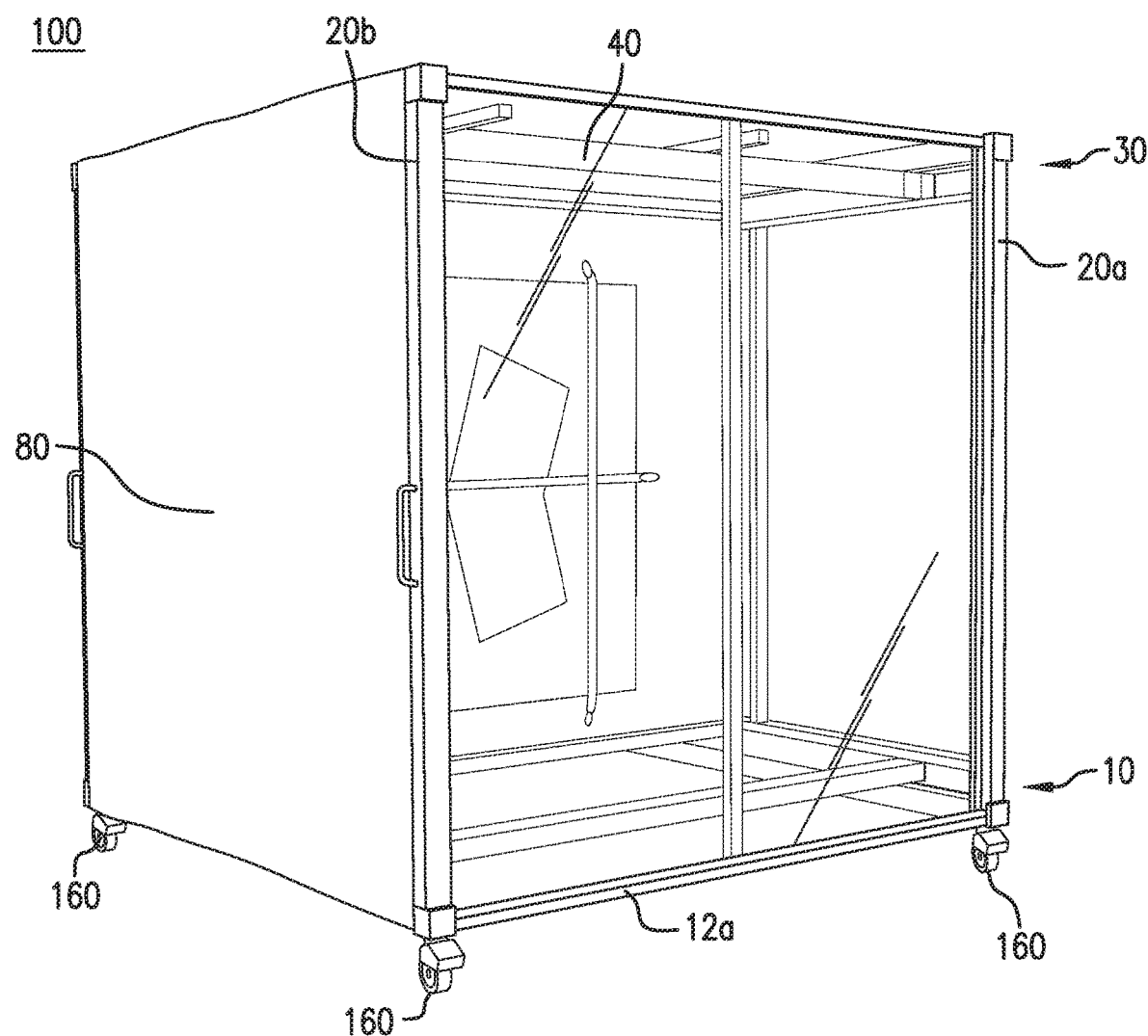
FIG. 1 is a perspective view of a mobile hanging storage unit, i.e., transporter 100, in a transport ready state, according to an embodiment of the present disclosure.

Various embodiments of the present disclosure will now be described in detail with reference to the accompanying drawings. In describing the drawings, similar reference numerals will be used to describe like elements and components. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

FIG. 1 is a perspective view of a mobile hanging storage unit, i.e., transporter 100, in a transport ready state.

In FIG. 1, each panel 50 of the transporter 100 is retracted therein and a protective cover 110 is in a closed position. Each panel is composed of aluminum or similar material to provide for a lightweight structure, and is retractable into and extendable from the transporter 100.

Figure 2:
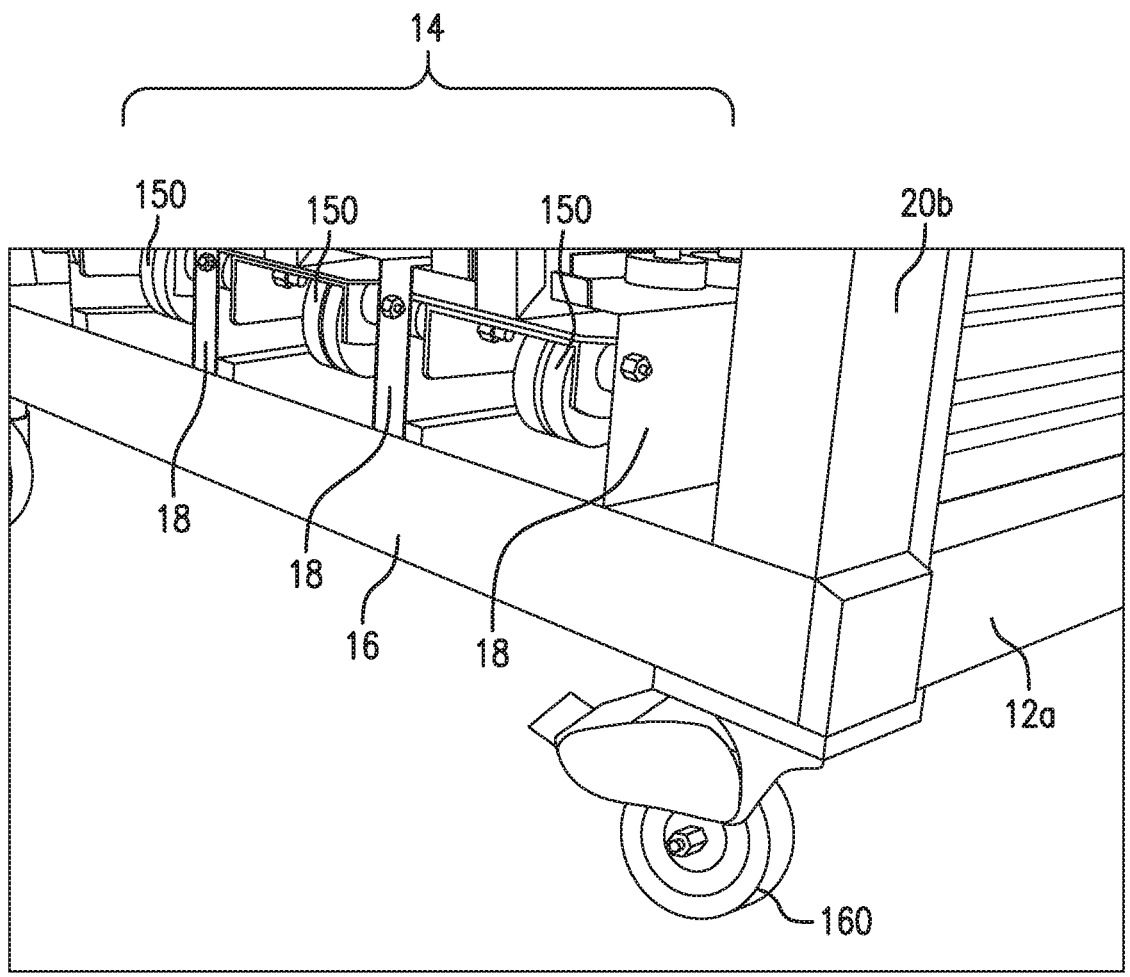
FIG. 2 is an enlarged view of a portion of the transporter of FIG. 1, according to an embodiment of the present disclosure.

The transporter 100 includes a lower frame structure 10, a plurality of posts 20a, 20b, an upper frame structure 30, at least one guidance tube 40, and at least one panel 50, as described in U.S. Pub. 2018/0249831 to Young. The lower frame structure 10 consists of at least two base extrusions, such as a first base extrusion 12a (FIG. 1) and a second base extrusion 12b (FIG. 7), as well as at least one lower guidance structure 14 (FIG. 2).

Each panel 50 includes a plurality of pins disposed along a top surface thereof to attach an upper end of the panel 50 to a bottom surface of the guidance tube 40. The panel 50 is engaged at a lower end with a respective roller assemblies 18 on a lower guidance rail 16. Coupled in this manner, the panel 50 is slidable back and forth through the roller assembly 18 and is slidable back and forth through the guidance tube 40. The guidance tube 40 is inserted through a respective guide assembly on a first guidance rail and a corresponding guide assembly on a second rail, and the guidance tube 40 is capable of sliding back and forth through the respective guide assembly.

The first base extrusion 12a and the second base extrusion 12b are substantially parallel to one another, thereby providing a transporter 100 having a substantially square-shaped lower portion. A caster 160 is provided on each opposite end of each of the first and second base extrusions 12a, 12b, thereby providing at least four casters 160, with one caster in each corner on the transporter 100. Preferably, at least two casters 160 are lockable, to stop the transporter 100 from rolling when supported by an inclined surface.

The upper frame structure 30 is substantially similar in size and shape to the lower frame structure 10. The upper frame structure 30 is substantially horizontally disposed above the plurality of posts 20a, 20b, which are substantially vertical, such that each bracket of the upper frame structure 30 is coupled to an upper end of one of the plurality of posts 20a, 20b. Thus coupled, each of the guide assemblies on a second upper guidance rail is positioned on same vertical planes as corresponding roller assemblies 18 on the lower guidance rail 16.

FIG. 2 is an enlarged view of a portion of the transporter 100 of FIG. 1, with the protective cover 80 removed showing panels 50 in a fully retracted position, i.e. in the transport ready state, according to an embodiment of the present disclosure.

FIG. 2 illustrates a locking caster 160 in one corner of the transporter 100. FIG. 2 also illustrates a plurality of slidable stabilizing wheels 150, with one stabilizing wheel 150 of the plurality of slidable stabilizing wheels provided on a respective panel 50. When the panel 50 is extended into a loading state, the stabilizing wheel 150 slides outward from the transporter 100. When the panel 50 is in the transport ready state, the slidable stabilizing wheel 150 retracts away out of sight.

Figure 3:
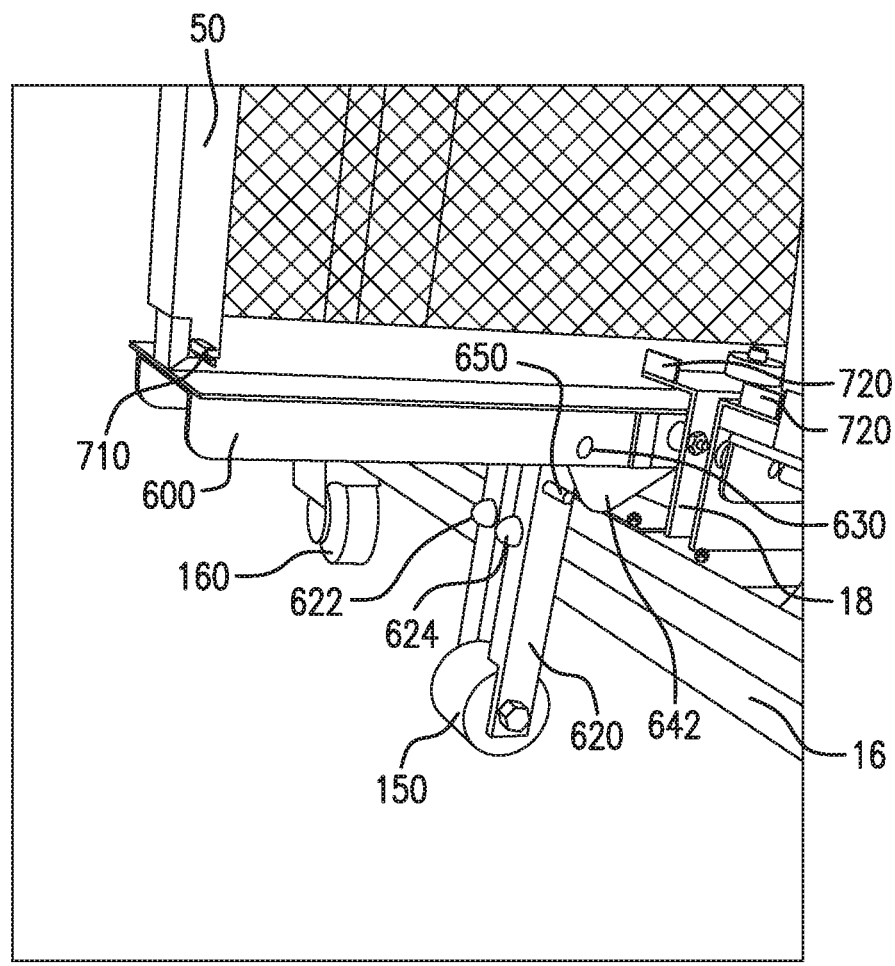
FIG. 3 illustrates the transporter of FIG. 1 with one panel in a first partially open position, according to an embodiment of the present disclosure.

FIG. 3 is a view of the transporter 100 with the protective cover 80 opened, with one panel 50 opened to a first partially open position. As shown in FIG. 3, a channel housing 600 extends downward from a plate 52, which is horizontally arranged and affixed to a forward, i.e. extendable, portion of an underside of panel 50.

FIG. 3 also shows a channel strut 620, a plurality of deformable members 622, 624, one end of a shaft strut 630, a latch shaft 640, and a strike shaft 650.

When the panel 50 is closed, in the transport ready state, a gas cylinder 610 (FIG. 7), the channel strut 620, the plurality of deformable members 622, 624, the shaft strut 630, the latch shaft 640, a latch 642 and the strike shaft 650 are enclosed within the channel housing 600.

Figure 4:
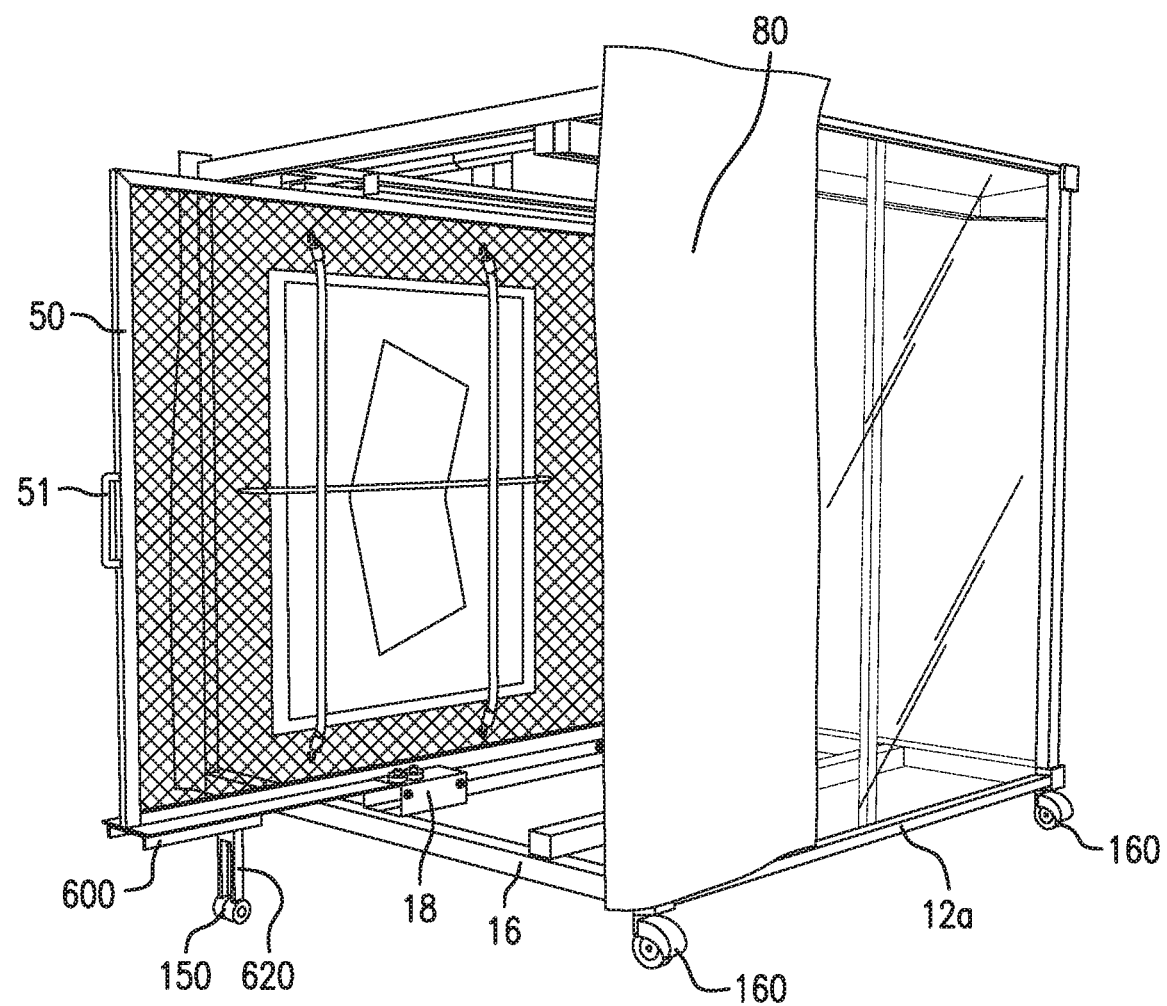
FIG. 4 is a perspective view of transporter of FIG. 1 with one panel in a second partially opened position, according to an embodiment of the present disclosure.

FIG. 4 is a perspective view of the transporter 100 with one panel 50 opened to a second partially opened position, in which extendable support, i.e. the lowered slidable stabilizing wheel 150, contacts the ground.

Figure 5A:
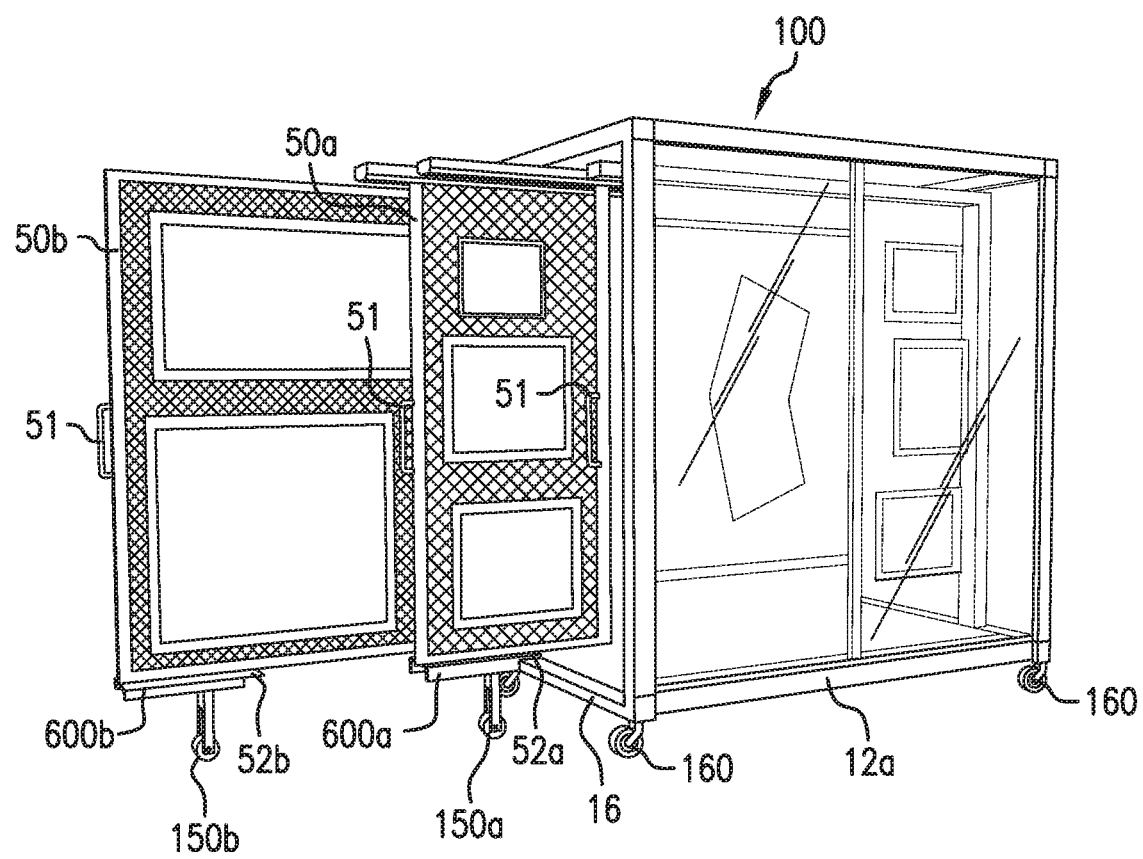
FIG. 5A is a perspective view of transporter of FIG. 1 with a first panel in the first partially opened position and a second panel in a fully opened position, according to an embodiment of the present disclosure.

FIG. 5A is a perspective view of the transporter 100 with a first panel 50a in the first partially open position and a second panel 50b in a fully open position. Each caster of the plurality of casters 160 contacts the supporting surface, to support the transporter 100. In the fully open position, the slidable stabilizing wheel 150b of the second panel 50b is fixed in a vertical orientation with the slidable stabilizing wheel 150b lowered to contact the ground. In contrast, in the partially open position, although the slidable stabilizing wheel 150a of the first panel 50a is vertically oriented, the slidable stabilizing wheel 150a does not contact the ground, as shown in FIG. 5B.

FIG. 5A shows channel housing 600b extending downward from plate 52b. As described above, the channel housing is horizontally arranged and affixed to the extendable portion of the underside of panel 50b.

When the second panel 50b is in the fully open position, the underside of panel 50b contacts the upper portion of the lower guidance rail 16, and the plate 52b does not contact the upper portion of the lower guidance rail 16. Therefore, the slidable stabilizing wheel 150b of the second panel 50b contacts the ground.

The profile view of the transporter of FIG. 5A that is provided in FIG. 5B shows the space between the slidable stabilizing wheel 150a, i.e., extendable support, when the first panel 50a is in the partially open position.

Since the first panel 50a is only partially extended in FIGS. 5A and 5B, plate 52a, rather than the underside of panel 50a, contacts the upper portion of the lower guidance rail 16, and the slidable stabilizing wheel 150a of the first panel 50a does not contact the ground.

Figure 6:
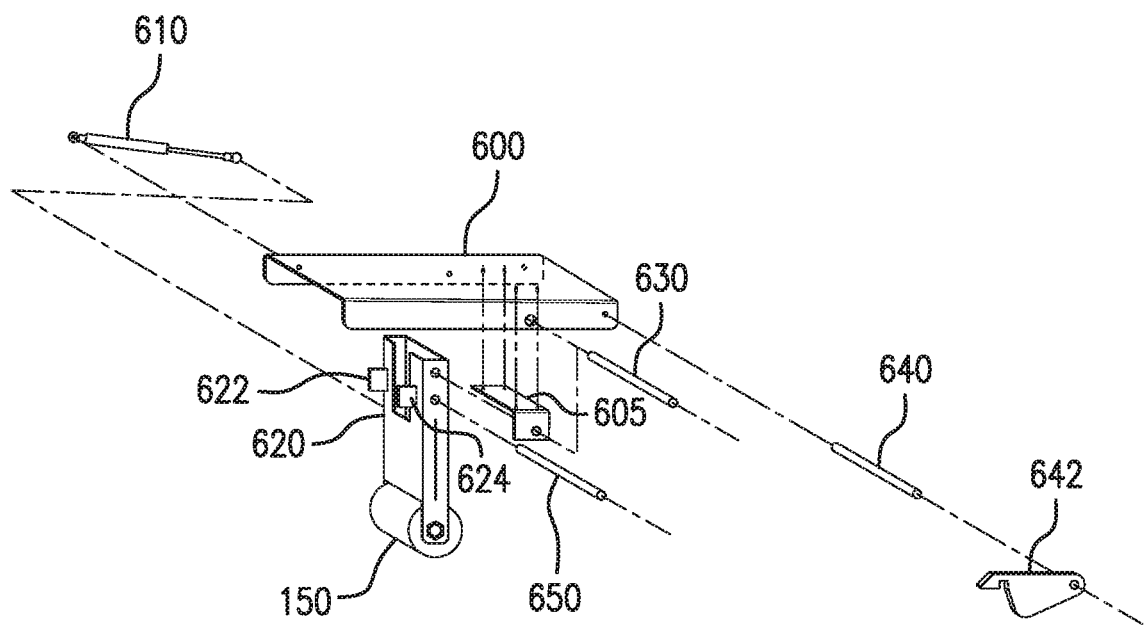
FIG. 6 is an exploded view of a channel housing, according to an embodiment of the present disclosure.

FIG. 6 is an exploded view of the channel housing 600, illustrating the assembly of a bracket shaft 605, the gas cylinder 610, the channel strut 620, the plurality of deformable members 622, 624, the shaft strut 630, the latch shaft 640, the latch 642 and the strike shaft 650 within the channel housing 600. As shown in FIG. 2, the channel housing 600 is provided in each respective roller assembly 18 of the lower guidance rail 16. When assembled, the gas cylinder 610 is configured to provide an extending force that pushes the channel strut 620 downward and away from the channel housing, to fix the gas cylinder 610 in the vertical orientation.

Figure 7:
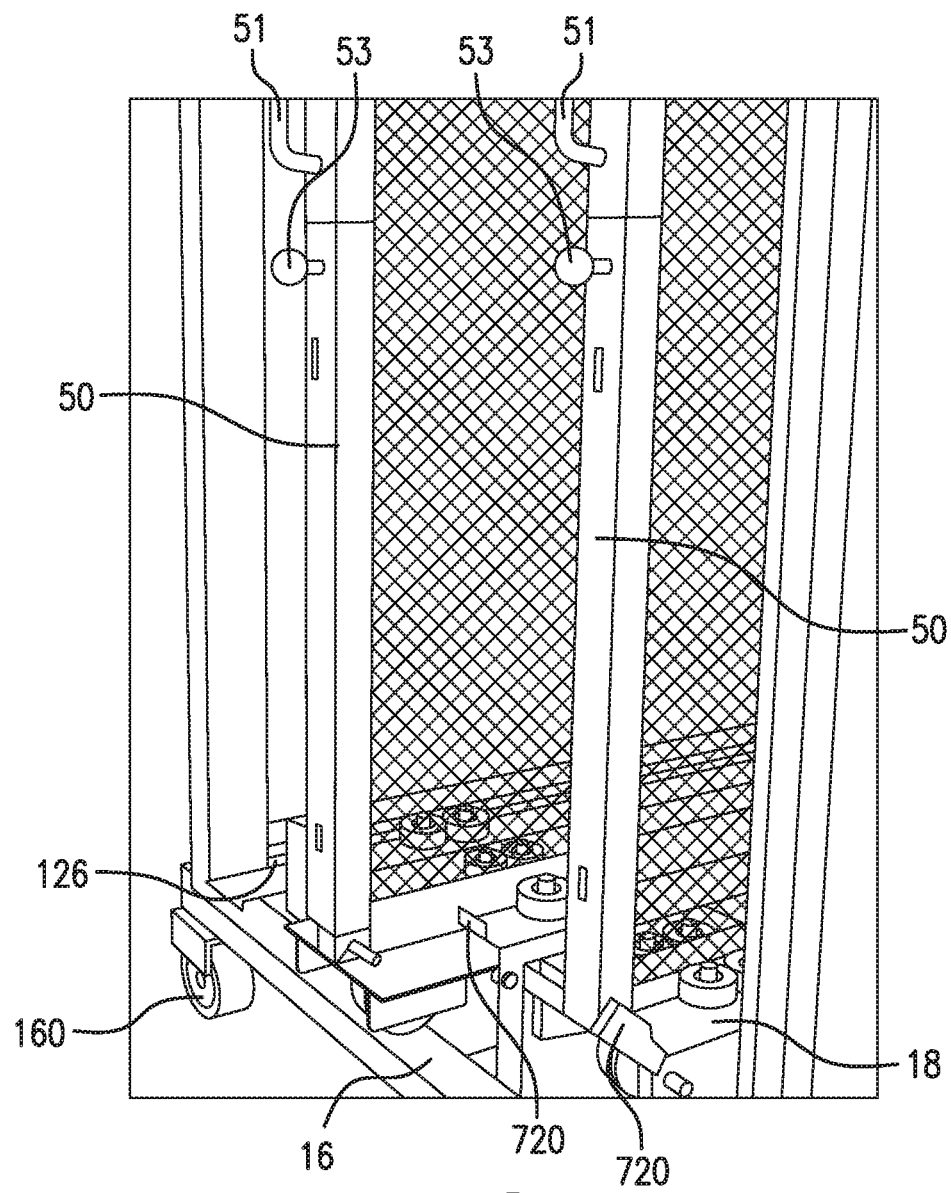
FIG. 7 illustrates a locking mechanism, according to an embodiment of the present disclosure.

FIG. 7 illustrates a locking mechanism, according to an embodiment of the present disclosure. A lip 720 is provided on an upper end of each roller assembly 18. (Also see FIG. 3.) When the panel 50 is closed in the transport ready state, the lip 720 is configured to catch striker 710, thereby precluding the panel 50 from being extended from a space provided within the transporter 100. To release the panel 50 from the transport ready state, a lock release 53 provided on the respective panel 50 is lifted. The lock release 53 is connected within the panel to the striker 710, and vertically moving the lock release 53 provides a corresponding vertical movement of the striker 710, thereby releasing the striker 710 from the lip 720.

FIG. 8 is a profile view of the locking mechanism of FIG. 7. As shown in FIG. 8, lifting the lock release 53 also lifts striker 710 above the lip 720, thereby releasing the panel 50 to be extended from the space formed within the frame of the transporter 100.

While the present disclosure has been shown and described with reference to various embodiments, it will be understood by those skilled in the art that various changes in form and details may be made therein without departing from the spirit and scope of the present disclosure. Therefore, the scope of the present disclosure is defined not by the detailed description of the present disclosure, but by the appended claims and their equivalents, and thus, all differences within the scope will be construed as being included in the present disclosure.

What is claimed:

1. A transporter, comprising:
    an upper frame;
    a plurality of posts;
    a lower frame comprising a guidance rail;
    at least one roller assembly provided on the lower frame;
    a plurality of casters provided on an underside of the lower frame and configured to contact a substantially horizontal surface supporting the transporter;
    at least one panel configured to extend from and retract into a space formed by the upper frame, the plurality of posts and the lower frame; and
    an extendable support coupled to the at least one panel,
    wherein the extendable support is configured to contact the substantially horizontal surface in response to the at least one panel being extended from the space, and
    wherein the extendable support comprises a plate affixed to an extendable portion of an underside of the at least one panel.

2. The transporter of claim 1, wherein the lower frame is substantially square shaped, and at least one caster of the plurality of casters is provided beneath each corner of the lower frame.

3. The transporter of claim 2, wherein at least two casters of the plurality of casters are lockable.

4. The transporter of claim 1, wherein the extendable support comprises a wheel configured to contact the substantially horizontal surface to support a distal end of the at least one panel, in response to the at least one panel being extended from the space, between a second partially open state and a fully open state.

5. The transporter of claim 1, wherein, in response to the at least one panel being extended from the space between a first partially open state and a second partially open state, the plate contacts the guidance rail.

6. The transporter of claim 5, wherein, in response to the at least one panel being extended from the space between the second partially open state and a fully open state, a lower edge of the at least one panel contacts the guidance rail.

7. The transporter of claim 1, wherein the extendable support further comprises a channel housing affixed to an extendable portion of an underside of the plate.

8. The transporter of claim 7, wherein the channel housing comprises flanges extending from the plate toward the substantially horizontal surface, which is horizontally arranged on a distal end of the panel.

9. The transporter of claim 7, wherein, in response to the at least one panel being in a transport ready state, the channel housing contacts the guidance rail.

10. The transporter of claim 1, wherein the extendable support comprises a channel strut having a first end and a second end.

11. The transporter of claim 10, wherein, in response to the at least one panel being in a transport ready state, the channel strut is positioned within the channel housing.

12. The transporter of claim 10, wherein, in response to the at least one panel moving from the transport ready state to a first extended state, the channel strut moves into a vertical orientation.

13. The transporter of claim 10, further comprising a gas cylinder operably connected to the channel strut, and configured to move the channel strut in a substantially vertical orientation.

14. The transporter of claim 10, wherein the first end of the channel strut is rotatably attached to the extendable support.

15. The transporter of claim 10, wherein the second end of the channel strut is rotatably attached to the channel housing.

16. A transporter, comprising:
    a frame comprising a guidance rail;
    at least one roller assembly provided on the frame;
    at least one panel configured to extend from and retract into a space above the frame; and
    an extendable support coupled to the at least one panel,
    wherein the extendable support is configured to contact a substantially horizontal surface supporting the transporter in response to the at least one panel being extended from the space to a second partially open state from a first extended state, and
    wherein the extendable support comprises a plate affixed to an extendable portion of an underside of the at least one panel.

17. The transporter of claim 16, wherein the extendable support comprises at least one of a plate and a wheel.

18. A transporter, comprising:
    a frame comprising a guidance rail;
    at least one roller assembly provided on the frame;
    a plurality of casters provided on an underside of the frame, and configured to contact a substantially horizontal surface;
    at least one panel configured to extend from and retract into a space formed by the frame; and
    an extendable support coupled to the at least one panel,
    wherein the extendable support is configured to contact the substantially horizontal surface in response to the at least one panel being extended from the space, and
    wherein the extendable support comprises a plate affixed to an extendable portion of an underside of the at least one panel.

19. The transporter of claim 18, wherein the extendable support is configured to not contact the substantially horizontal surface in response to the at least one panel being retracted into the space.

* * * * *